United States Patent

Zawilski

[19]

[11] Patent Number: 6,069,567
[45] Date of Patent: May 30, 2000

[54] AUDIO-RECORDING REMOTE CONTROL AND METHOD THEREFOR

[75] Inventor: Peter S. Zawilski, Sunnyvale, Calif.

[73] Assignee: VLSI Technology, Inc., San Jose, Calif.

[21] Appl. No.: 08/978,333

[22] Filed: Nov. 25, 1997

[51] Int. Cl.[7] .............................. H04B 1/00; H04Q 1/00
[52] U.S. Cl. .............................. 340/825.22; 340/825.69; 340/825.72; 348/734; 455/151.2
[58] Field of Search .......................... 340/825.72, 825.69, 340/825.22; 348/734; 455/150.1, 151.1, 151.2, 153.2, 157.1

[56] References Cited

U.S. PATENT DOCUMENTS

| | | | |
|---|---|---|---|
| 5,068,734 | 11/1991 | Beery | 358/191.1 |
| 5,201,067 | 4/1993 | Grube et al. | 455/89 |
| 5,287,109 | 2/1994 | Hesse | 341/176 |
| 5,287,210 | 2/1994 | Sefidvash | 395/147 |
| 5,606,443 | 2/1997 | Sgambati | 359/143 |
| 5,625,608 | 4/1997 | Grewe et al. | 369/24 |
| 5,627,540 | 5/1997 | Deguchi et al. | 341/176 |
| 5,631,652 | 5/1997 | Lee | 341/176 |
| 5,638,056 | 6/1997 | Nakashima et al. | 340/825.71 |
| 5,644,303 | 7/1997 | Gioscia | 340/825.72 |
| 5,650,774 | 7/1997 | Drori | 340/825.32 |

*Primary Examiner*—William A. Cuchlinski, Jr.
*Assistant Examiner*—Yonel Beaulieu

[57] ABSTRACT

A remote control has the ability to record the aural characteristics of a user's listening environment. Integral microphones receive the loudspeaker output providing feedback to the unit while the user makes adjustments to the audio/visual equipment. The remote control is programmable to control a plurality of different makes and arrangements of remote-operable ANV equipment. The sonic characteristics of the loudspeakers in combination with the room's acoustics are processed by the remote in the form of a "sound signature." This "sound signature" is remembered along with the corresponding physical settings of the A/V equipment's controls to provide the user with a selectable listening experience.

13 Claims, 6 Drawing Sheets

AUDIO-RECORDING REMOTE CONTROL AND METHOD THEREFOR

FIELD OF INVENTION

This invention relates generally to control circuits for controlling electronic equipment. More particularly this invention relates to the control of audio/video (A/V) equipment.

BACKGROUND OF THE INVENTION

Many types of electronic equipment are sold today along with a remote control unit. These remote control units take on a variety of different forms and, depending on the electronic equipment that they are sold with, can be relatively complex and, hence, not very user friendly. One type of electronic equipment that is often sold with a remote control unit is a sound system, for example, as implemented for a home theater. Electronic equipment used to implement sound systems for such upper-end application are often purchased with an expectation of enjoyment, relaxation, and comfort. High quality sound systems, however, typically include a variety and extensive list of programmable sound altering features. These include, for example, equalizer-related functions, balance and fade functions, and various stereo surround or selectable options. Accordingly, with such electronic equipment, realizing the benefits of enjoyment, relaxation, and comfort typically requires some rather laborious studying and adjusting of complex equipment and sound settings.

There is therefore a need for an intelligent remote control unit and control process that resolves the tension between the laborious task of adjusting the equipment for the desired sound and using the equipment to realize comfort, enjoyment, and relaxation without undue delay or effort.

SUMMARY OF THE INVENTION

The present invention is exemplified in a number of implementations, two of which are summarized below. According to this example embodiment, a remote control unit controls an audio-generating apparatus. The unit includes: a microphone; a memory; a user-interface for generating user commands; a signal processing circuit configured and arranged to respond to a first user command by programming the memory with apparatus-setting data corresponding to an audio state of the audio-generating apparatus, and to respond to a second user command by recalling the apparatus-setting data from memory; and a transmitter circuit, responsive to the signal processing circuit, configured and arranged to send control signals for resetting the audio-generating apparatus in the audio state corresponding to the apparatus-setting data.

The second embodiment is directed to a method for remotely controlling an audio-generating apparatus in response to user commands. The method includes: detecting sound generated by the audio-generating apparatus; responding to a first user command by storing apparatus-setting data corresponding to an audio state of the audio-generating apparatus; responding to a second user command by recalling the apparatus-setting data; and sending control signals that reset the audio-generating apparatus in the audio state corresponding to the apparatus-setting data.

The above summary of the present invention is not intended to review each disclosed embodiment, or every aspect of the present invention. From the figures and the detailed description which follow, additional embodiments and aspects should become apparent.

BRIEF DESCRIPTION OF THE DRAWINGS

The invention may be more completely understood in consideration of the detailed description of various embodiments of the invention which follows in connection with the accompanying drawings, in which.

Figure 1:
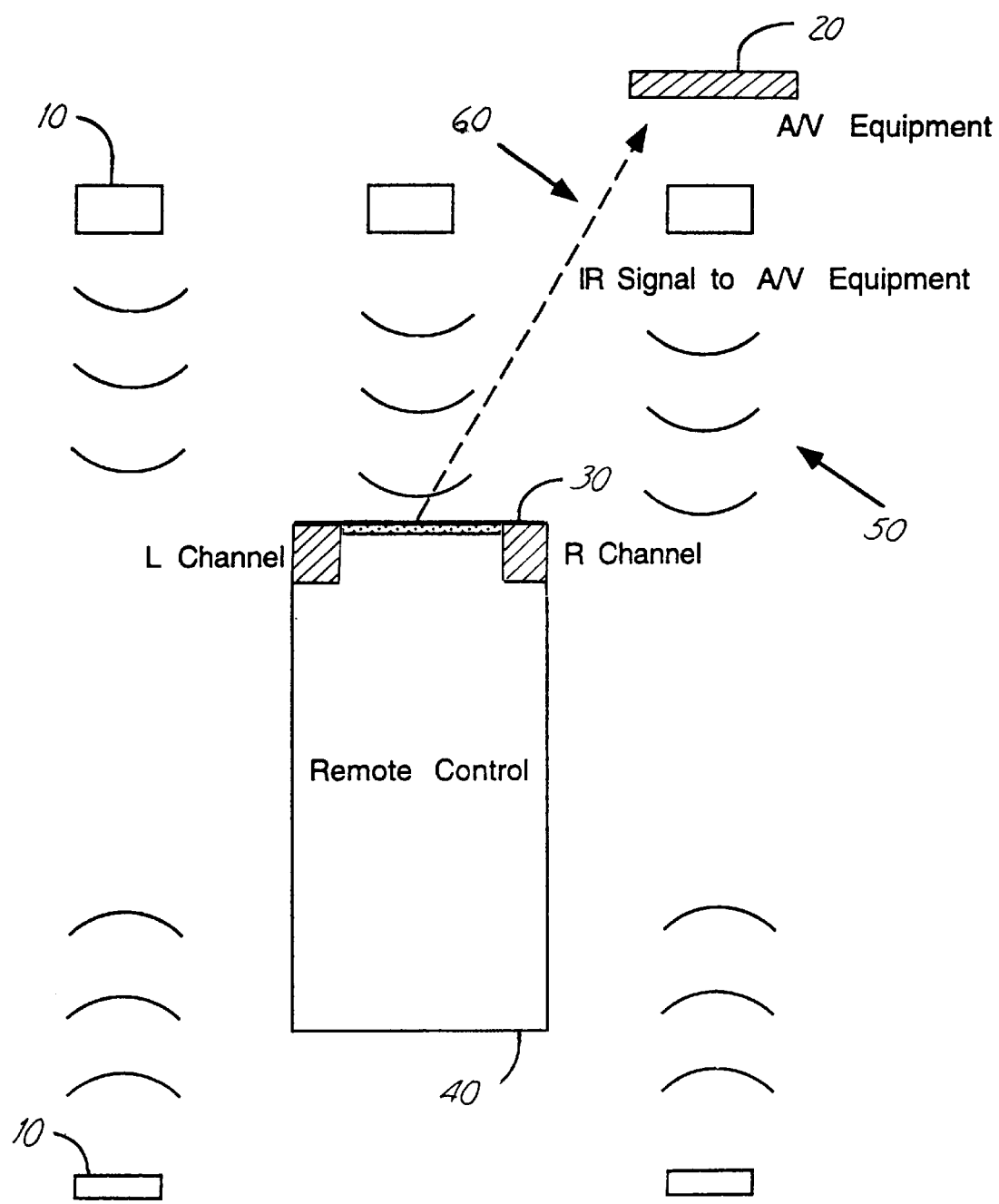
FIG. 1 is a top-level view of the invention as used in an example home theater setup, according to the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE DISCLOSED EMBODIMENTS

The present invention is believed to be applicable to a variety of systems and arrangements that are controlled remotely based on previously-collected information. The invention has been found to be particularly advantageous in application environments where relatively complex audio settings are used, such as stereo systems and home theater systems. While the present invention is not so limited, an appreciation of various aspects of the invention is best gained through a discussion of application examples operating in such an environment.

FIG. 1 illustrates one particular embodiment, according to the present invention, in which a top-level view of an example remote control. Speakers 10 provide the audio signal 50 that is heard by the microphones 30 on the remote. In this example embodiment, the remote has two microphones for receiving a stereo signal. As home theater systems become more complex, the capturing of the audio information is enhanced with additional microphones. Additional microphones can be mounted on the remote and they can be of differing types. For example, the stereo microphones mounted on the front of the remote control 40 are likely to be unidirectional, that is they pick up the sounds emanating from the front left, center, and right speakers. Additional microphones may be omnidirectional in that they pick up the sounds from the rear speakers and the subwoofers whose directionality is not as distinct. The remote 40 responds to the sound by sending a signal 60 to the A/V equipment 20 thereby making adjustments in response to the ANV equipment's sound output and the previously stored settings within the remote control. The transmitted signal can be in a number of formats readable by an appropriate receiver in the A/V equipment. For example, it can be an infrared (IR) format of readable by many types of audio gear. Information in the signal may consist of, but is not necessarily limited to, one or more of the following: volume, equalization, balance, and surround sound encoding information.

Figure 2:
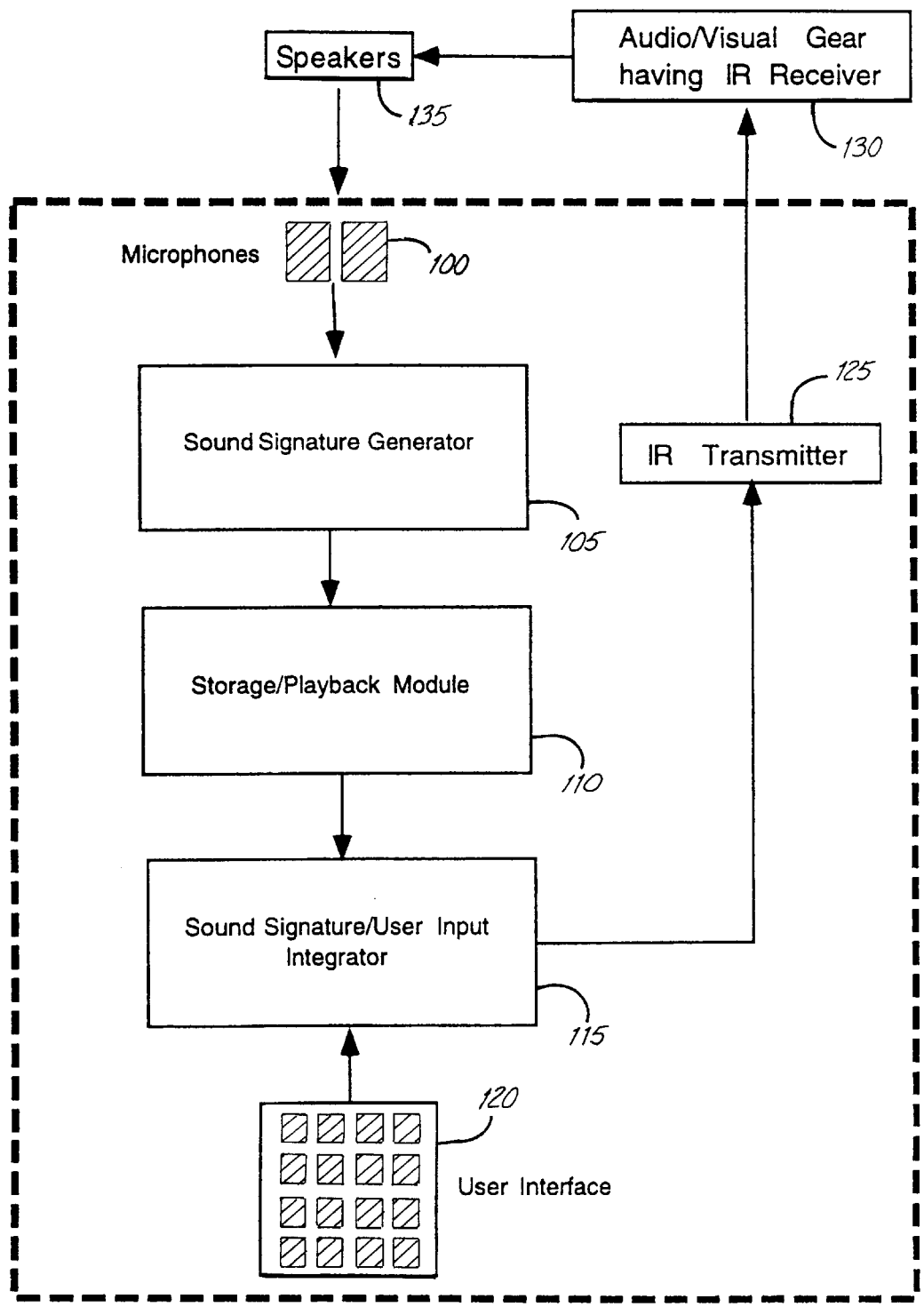
FIG. 2 is block diagram of a portion of an audio system according to one embodiment of the present invention.

FIG. 2 is an example embodiment of a hand-held remote control. In a typical application, the user has audio/visual equipment he or she wishes to control f-rom a remote location. Each piece of equipment is capable of receiving signals from an infrared remote control console supplied with the equipment. Therefore, it is not unusual for an audio/visual setup to have several remote controls for various pieces of equipment. The remote controls can often be lost or damaged or add to the confusion of setting up the system to the listener's particular tastes and needs. For example, taking a top-level view of the user's audio/visual setup (e.g. a "home theater."), the remote control works in this way. First, the user activates his equipment and finds that the sound volume level, the balance, and the treble-bass characteristics are not to his liking. The microphones 100 on the remote hears the sound output from the speakers 135 set up for a home theater. The microphones convey the sound energy into an analog signal which feeds into the input of the processing circuit. The processing circuit converts the electrical signal of the microphone into a digital form. The digital representation of the sound represents a "signature" which the processing circuit stores for later retrieval and use. While this sound signature is being written, the listener with the user-interface is entering the desired settings of the targeted A/V equipment. In conjunction with the user interface, such as a keypad 120, the settings to the audio/visual equipment are sent to a transmitter, such as an IR transmitter 125. Using the IR transmitter embodiment, electrical signals encoded within the transmitter are converted to light pulses for the desired equipment settings and are received using IR sensor circuitry and processed by the targeted audio/visual gear 130.

The remote control in this example embodiment has two modes of operation, "learn" and "playback." In the learn mode, the remote listens to and remembers the sound of the equipment with respect to the room acoustics after the user makes the audio adjustments via the keypad. After learning of the users' desired audio settings, the user sets the remote to "playback" mode. If the settings in the equipment are changed by other users, the first user merely has to point the remote to the equipment and the equipment is reset to the sound characteristics the remote has heard earlier. During the readjustment of the listener's A/V equipment, the remote matches the presently captured sound signature with the one stored previously.

Figure 3:
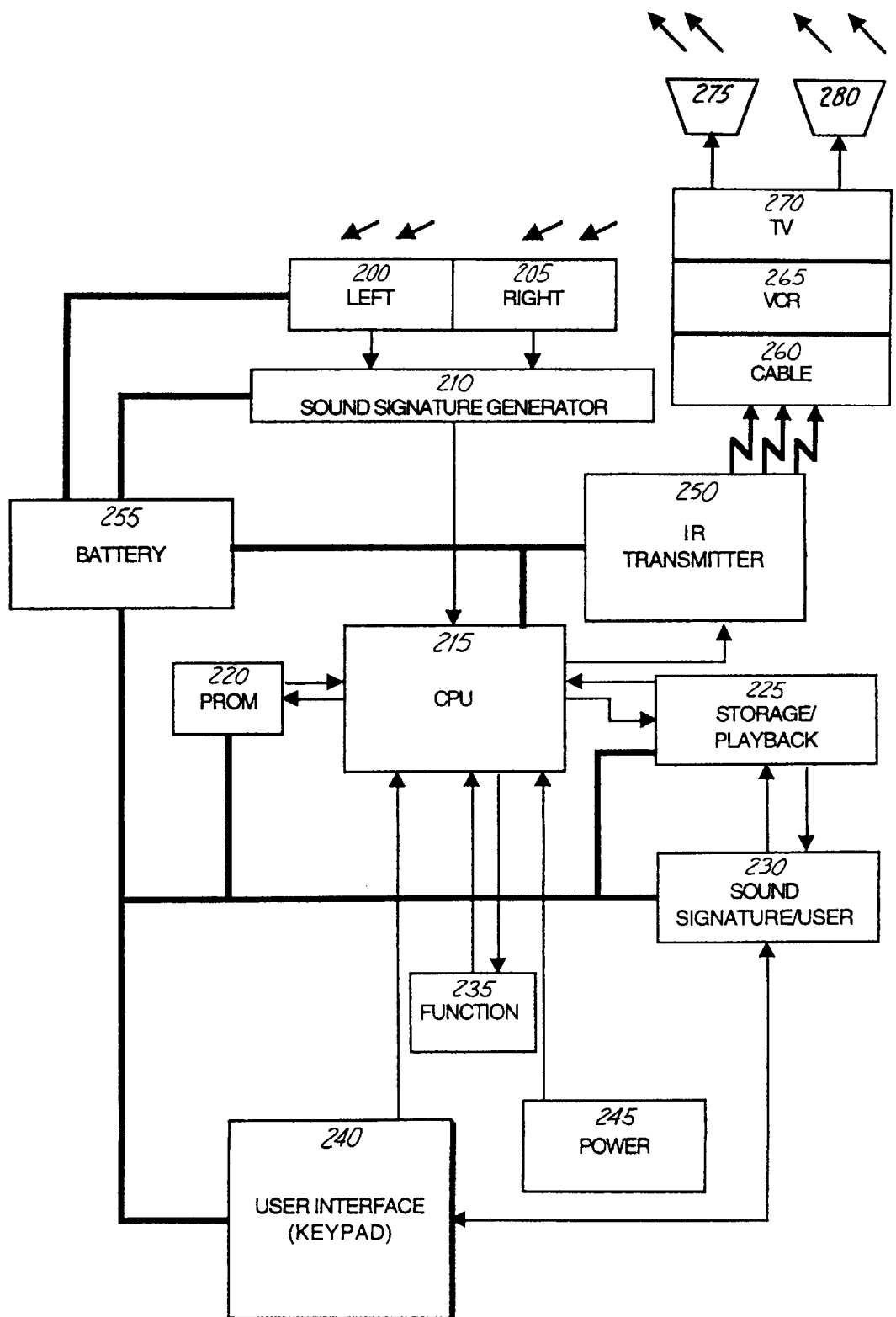
FIG. 3 is a block diagram of another example embodiment according to the present invention.

FIG. 3 illustrates another example embodiment according to the arrangement of the present invention. In this embodiment, the remote control is modified to have a stereo microphone and modules which enable the remote control to remember the sound characteristics of the source. In this case the output sound source is a television. The TV receives on-air broadcast signals, VCR output, or cable broadcast signals.

The user may desire to set a comfortable volume level using the remote control. This may be accomplished for a particular broadcast channel. Further, by depressing a power-on switch 245, the user can activate the equipment. The remote's internal power is supplied by a battery 255.

Using the function switch 235 and assuming that the user has programmed the remote control to operate with the targeted types of equipment, the user selects one of the items of equipment to control. Example types include television, a video cassette recorder, and cable box. With the keypad, the user sets the desired volume of the TV with the remote's keypad 240. The keypad command is processed in the CPU 215 and the resulting command is sent to the IR Transmitter 250 which sends the signal to the TV and the volume is adjusted higher or lower. At this point, the user can press a key to activate the stereo microphone 200, 205 to "listen" to the TV's sound. The microphones' analog output is translated by the sound processor 210 into a "sound signature" form which is processed by the CPU 215. The sound signature may be written using conventional digital signal processing techniques. The sound is "remembered" by the remote control through memory functions implemented using the CPU. Also remote commands compatible with a multitude of brands of A/V equipment are stored in the PROM at 220. The keypad settings at that point are processed by the CPU and the corresponding sound signature generated by the sound processor 210 are remembered as well. Thus, the physical adjustments made on the remote and transmitted to the A/V equipment have a corresponding sound signature associated with it.

Accordingly, the remote control remembers what it has heard. For example, the user has set the volume level of the television to a level 5 out of a maximum of 10 levels and, using the "learn mode," the remote hears and remembers the volume level.

Subsequently, the volume controls of the TV are adjusted to 10 by another user. The user who had programmed the more moderate setting aims the remote at the TV and the remote hears the too loud sound output and transmits the remembered volume setting of 5 to restore the user's preference, the preference based upon what the remote has heard in a given first location of the room.

In an example application, the remote control is worn by the user. Various fastening devices are available which can be adapted to a remote control to allow one to clip the unit his or her clothing. As the user moves about the acoustic space of the TV, the remote will continually sense and send IR signals via the IR transmitter 250, to the readjust the TV volume to maintain the perceived loudness at the same level as was set in the room's first location. For example, if the user moves closer to the TV, the remote will lower the volume to keep the relative setting a "5". As the user moves away, the remote will increase the volume to maintain the relative setting of "5" as well. Do note that this sequence of events is readily applicable to a more complex setup such as a home theater which may have multiple channel amplifiers, program sources, and speakers and a multitude of complex aural parameters such as equalization, balance, and surround delay between front and rear speakers.

Figure 4:
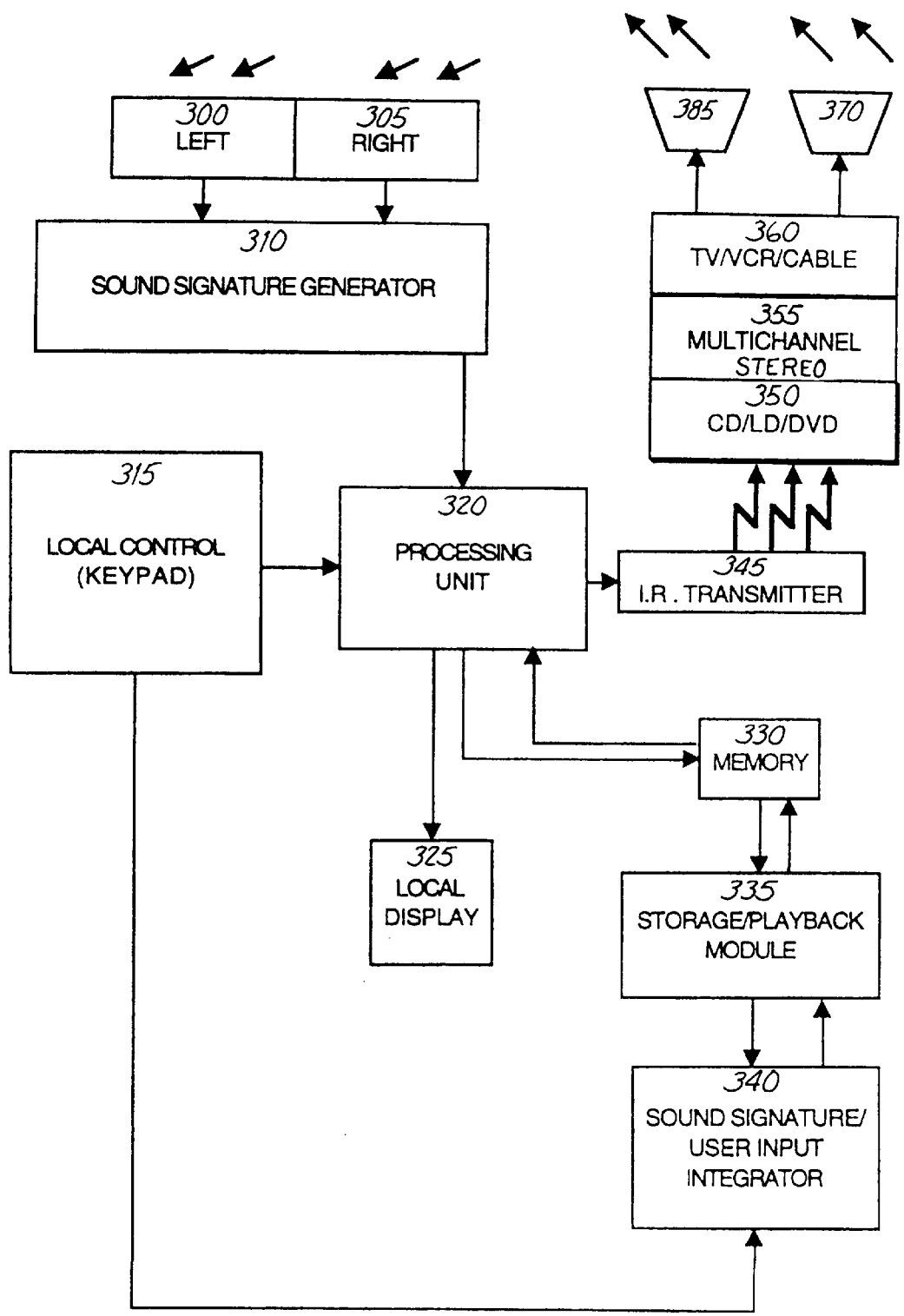
FIG. 4 is a block diagram of another example embodiment according to the present invention.

FIG. 4 outlines another example embodiment of the invention and how it is applied to another means for controlling audio/visual equipment. In this example, the sound from an audio portion coming from speakers 365 and 370 of the television or other source. The user desires to setup and have stored for future use, the aural characteristics of his or her listening environment. In the setup mode, microphones 300 and 305 mounted on the remote control "hear" the sound and generate an output which is fed into the sound processor 310. The sound processor converts the sound into a form useable by the processing unit 320. The processing unit directs the "sound signature" to memory. Also it receives commands from the user interface 315. A local display 325 provides the user a status of the equipment under control. During this time, the user adjusts the sound characteristics of his high fidelity listening environment with the user interface 315. For example, he may adjust the volume, the frequency response, balance, the time delay between front and rear speakers to suit his or her taste. All the while these adjustments are made, the microphones are picking up the sound and the received sound is converted by the sound processor 310. The user commands from the user interface 315 and the captured sound signature are stored in memory 330.

If the settings to the audio equipment have been changed or the living space has been changed. The user can have the remote recall the settings and the remote will adjust the equipment to what was heard previously. Settings on the A/V equipment are associated with that equipment's sound output and the room's response to that sound output, as well.

In another example embodiment involving a commercial setting, a home audio system is configured for a customer listening to a demonstration of different brands of A/V gear. For details regarding such a commercial situation, reference may be made to U.S. Pat. No. 5,606,443 of William J. Sgambati, "Control Circuit for Entertainment System Demonstration." which is herein incorporated by reference.

For further information and programming details, reference may be made to U.S. Pat. Nos. 5,644,303 of Richard Gioscia, "Specialized Shaped Universal Remote Commander" and U.S. Pat. No. 5,068,734 by Jack Beery, "Apparatus for Controlling a Television Receiver," each incorporated by reference.

Figure 5:
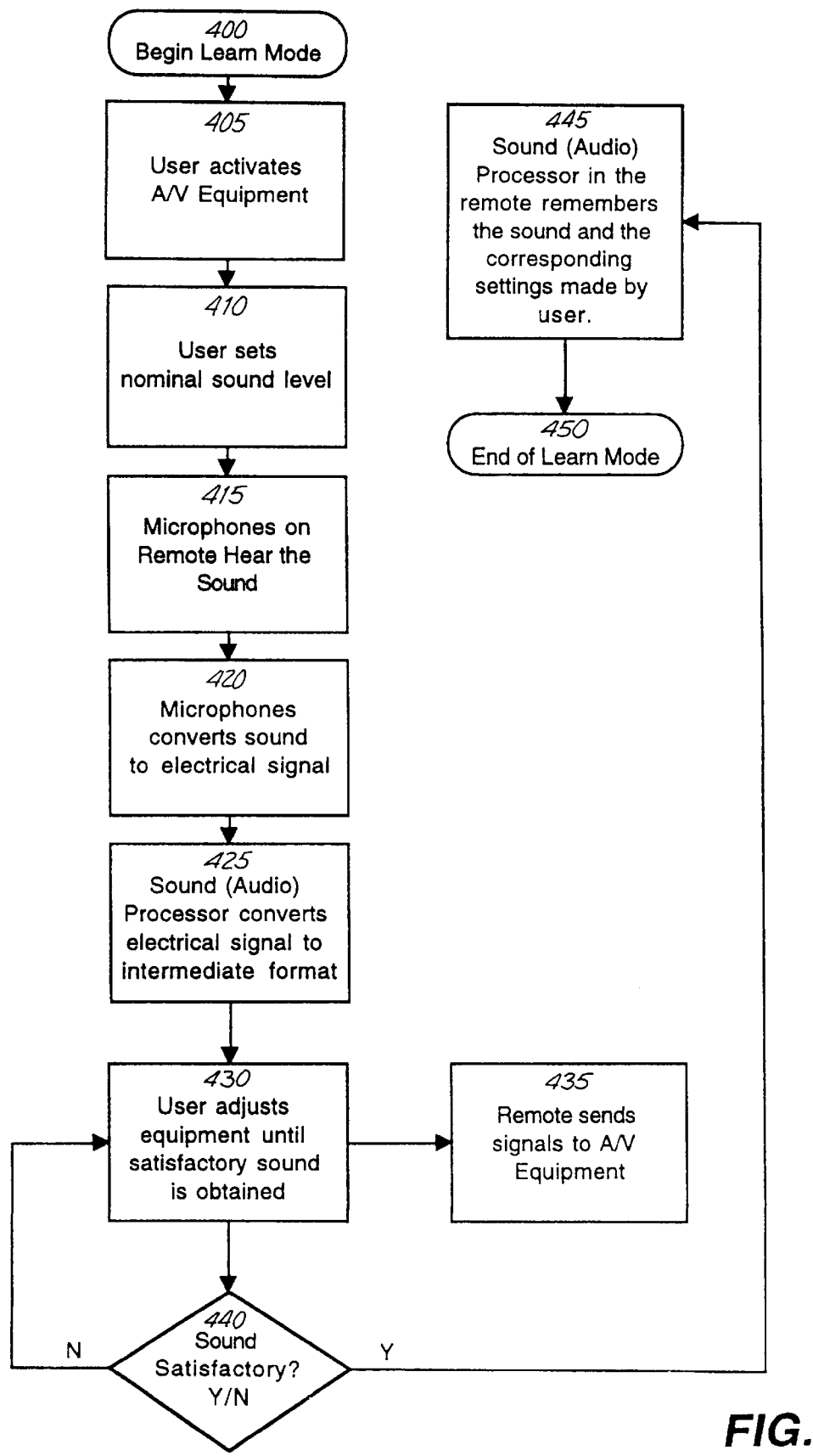
FIG. 5 is a flow diagram illustrating one manner in which a remote can be programmed according to the present invention.

FIG. 5 illustrates, as an example, the steps in storing the A/V equipment's sound signature and their corresponding settings for the sample embodiments cited. At 400, the user sets the remote control into the "learn mode." Next, at 405 the user switches on the A/V equipment, and makes nominal sound adjustments, 410. Microphones 415 on the remote control pick up the sound from the speakers and convert the sound into an electrical signal, 420. Next, the sound processor, 425 converts the signal into an digital format which can be manipulated. The user adjusts, 430 the equipment until satisfactory sound is obtained, 440. During the adjusting process, the remote is sending out signals to the A/V equipment, 435. The sound processor 445 remembers the audio characteristics of what is emanating from the A/V system's loudspeakers and the room's response and the corresponding settings of the A/V equipment. Having achieved a satisfactory listening environment, the user takes the remote out of the learn mode, 450.

Figure 6:
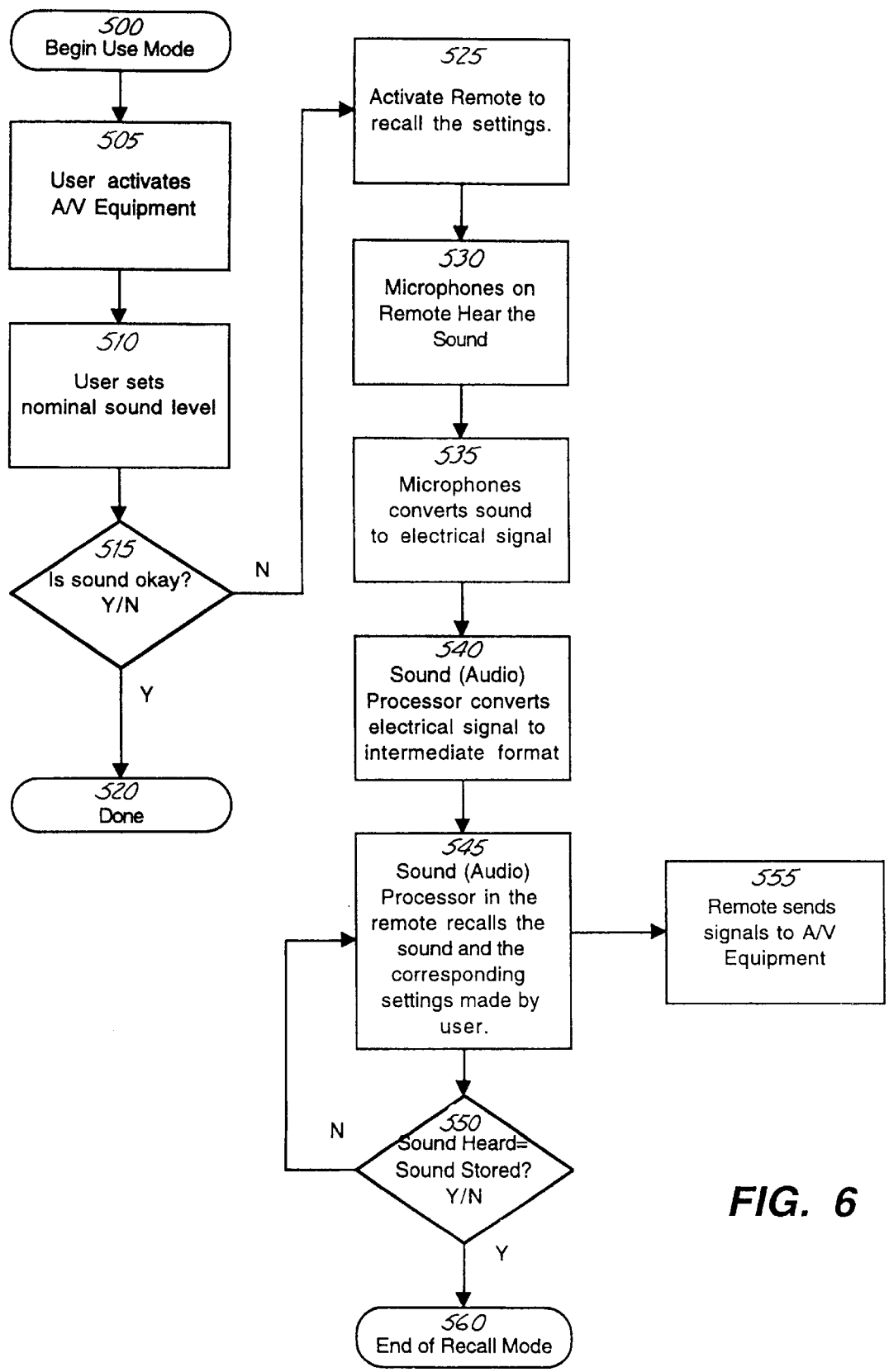
FIG. 6 is a flow diagram illustrating an example operation implemented in connection with another aspect of the present invention.

FIG. 6 illustrates, as an example, the steps in restoring the settings of the A/V equipment as the remote is placed in the "use mode" 500. The user activates the A/V equipment, 505. and sets nominal sound level is set, 510. The user hears the sound and determines whether it is satisfactory, 515. if the sound is satisfactory, the user is done 520. If the sound is not satisfactory, the user activates the remote to recall the settings, 525. Microphones on the remote hear the sound 530. Again, the microphones convert the sound into an electrical signal, 535. The audio processor converts the signal to a digital form, 540. The sound processor 545 recalls the sound the and the corresponding settings previously made by the user. The remote sends signals to the A/V equipment to make the adjustments until the sound presently heard is what was stored during the learn mode 550. Completing that, the recall mode is terminated 560 when it has been verified that the sound which had been previously set is emanating from the loudspeakers and the acoustic environment.

While the present invention has been described with reference to several particular example embodiments, those skilled in the art will recognize that many changes may be made thereto without departing from the spirit and scope of the present invention, which is set forth in the following claims.

What is claimed is:

1. A remote control unit arranged to control an audio-generating apparatus comprising:

a microphone;

a memory;

a user-interface for generating user commands;

a processor-based circuit, including an audio signal processor configured and arranged to respond to a first user command by programming the memory with apparatus-setting data corresponding to an audio state of the audio-generating apparatus, and, the audio state captured by the processor-based circuit via the microphone, to respond to a second user command by recalling the apparatus-setting data from memory; and a transmitter circuit, responsive to the processor-based circuit, configured and arranged to send control signals for resetting the audio-generating apparatus in the audio state corresponding to the apparatus-setting data.

2. A remote control unit as recited in claim 1 wherein the transmitter circuit generates an infrared light signal.

3. A remote control unit as recited in claim 1 wherein the transmitter circuit generates an ultrasonic signal.

4. A remote control unit as recited in claim 1 wherein the transmitter circuit generates a radio signal.

5. A remote control unit as recited in claim 1 wherein the transmitter circuit generates an electrical signal carried by a wire, the wire having a physical connection to the audio apparatus.

6. A remote control unit as recited in claim 1 wherein the audio state includes at least one of the following attributes of volume, frequency, and delay.

7. A remote control unit arranged to control an audio-generating apparatus comprising:

means for generating signals which represent sound;

means for storing;

means for generating user commands;

a processor-based means, including an audio signal processor means, means for responding to a first user command by programming the storing means with apparatus-setting data corresponding to an audio state of the audio-generating apparatus, the audio state captured by the processor-based means via the signal generating means, for responding to a second user command by recalling the apparatus-setting data from the storing means; and means, responsive to the means for responding, for sending control signals that reset the audio-generating apparatus in the audio state corresponding to the apparatus-setting data.

8. A remote control unit arranged to control an audio-generating apparatus, according rto claim 7, wherein the means for generating user commands includes a keypad.

9. A remote control unit arranged to control an audio-generating apparatus, according to claim 7, wherein the means for generating user commands includes a dial.

10. A remote control unit arranged to control an audio-generating apparatus, according to claim 7, wherein the means for responding to a first user command includes at least one of: a digital signal processor chip, and a programmed array of logic circuits.

11. A remote control unit as recited in claim 7 wherein the audio state includes at least one of the following attributes of volume, frequency, and delay characteristics.

12. A remote control unit arranged to control an audio-generating apparatus in a listening environment comprising:

a microphone;

a memory;

a user-interface for generating user commands;

a processor-based circuit, including an audio signal processor configured and arranged to respond to a first user command by programming the memory with apparatus-setting data corresponding to a combined audio state of the audio-generating apparatus and the listening environment, and, the audio state captured by the processor-based circuit via the microphone, to respond to a second user command by recalling the apparatus-setting data from memory; and a transmitter circuit, responsive to the processor-based circuit, configured and arranged to send control signals for resetting the audio-generating apparatus in the audio state corresponding to the apparatus-setting data.

13. A remote control unit as recited in claim 12 wherein the combined audio state of the audio-generating apparatus and the listening environment include the attributes of volume, frequency, and delay.

* * * * *

UNITED STATES PATENT AND TRADEMARK OFFICE
CERTIFICATE OF CORRECTION

PATENT NO.    : 6,069,567
DATED         : May 30, 2000
INVENTOR(S)   : Zawilski

Page 1 of 1

It is certified that error appears in the above-identified patent and that said Letters Patent is hereby corrected as shown below:

Column 6,
Line 44, beginning with "a transmitter circuit," should not be indented.

Column 7,
Line 12, after "and", starting with "means, responsive" a new line should begin, not indented.
Line 17, "rto" should read -- to --.

Signed and Sealed this

Seventh Day of May, 2002

Attest:

JAMES E. ROGAN
Attesting Officer      Director of the United States Patent and Trademark Office